United States Patent [19]

Grönke

[11] Patent Number: 4,617,827
[45] Date of Patent: Oct. 21, 1986

[54] FLOWMETER SYSTEM

[75] Inventor: Helmut Grönke, Nordstemmen, Fed. Rep. of Germany

[73] Assignee: Diesel GmbH & Company, Hildesheim-Bavenstedt, Fed. Rep. of Germany

[21] Appl. No.: 705,641

[22] Filed: Feb. 26, 1985

[30] Foreign Application Priority Data

May 18, 1984 [DE] Fed. Rep. of Germany ....... 3418446

[51] Int. Cl.$^4$ ............................................ G01F 15/08
[52] U.S. Cl. ...................................... 73/200; 55/170; 222/69
[58] Field of Search .............. 73/200; 222/69; 55/165, 55/170

[56] References Cited

U.S. PATENT DOCUMENTS

| | | | |
|---|---|---|---|
| 2,913,068 | 11/1959 | Mistarz et al. | 55/170 |
| 3,707,983 | 1/1973 | Butler | 73/200 X |
| 4,074,734 | 2/1978 | De Beau et al. | 73/200 X |

*Primary Examiner*—Herbert Goldstein

*Attorney, Agent, or Firm*—Wells & Wells

[57] ABSTRACT

A flowmeter system for receiving liquids from stationary reservoirs onto tanker vehicles, in particular milk, with a self-priming displacement pump followed by a deaerator with a venting valve mounted above a float and acted on by it, in turn followed by a flowmeter and lastly a check valve, is capable of high flow rates with nevertheless precise quantification with a simple design of the aerator.

The invention provides that the inside diameter of the venting valve aperture and the outside of deaerator float obey the following relation $$d^2/D^2 = p/c$$

where
d = inside diameter of the venting valve aperture
D = outside float diameter
p = pressure in bars generated by the displacement pump for pure air conveyance
c = 78.

1 Claim, 3 Drawing Figures

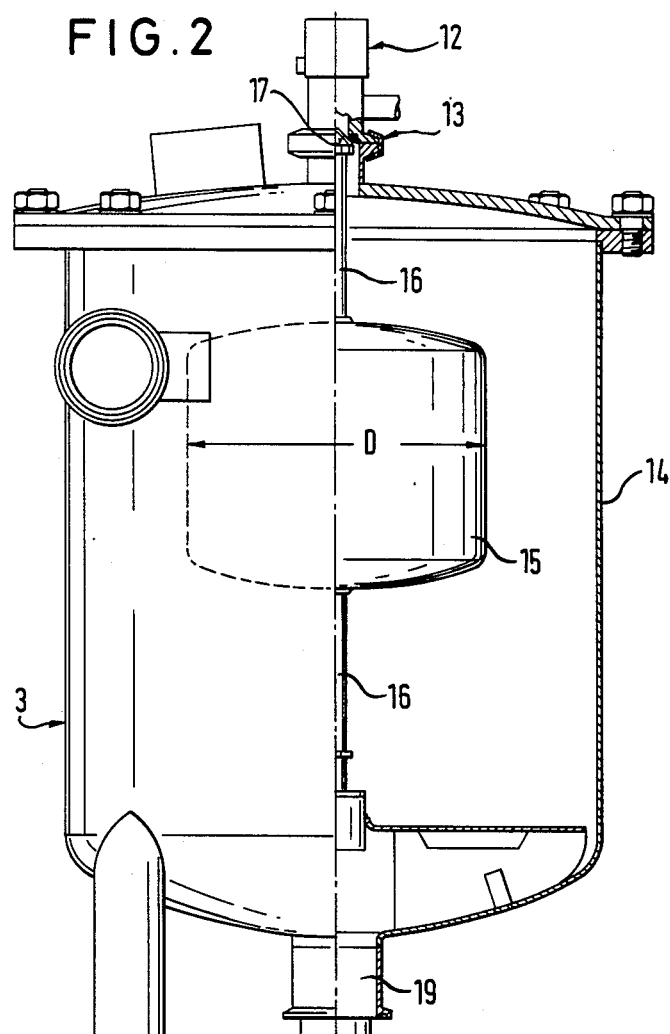
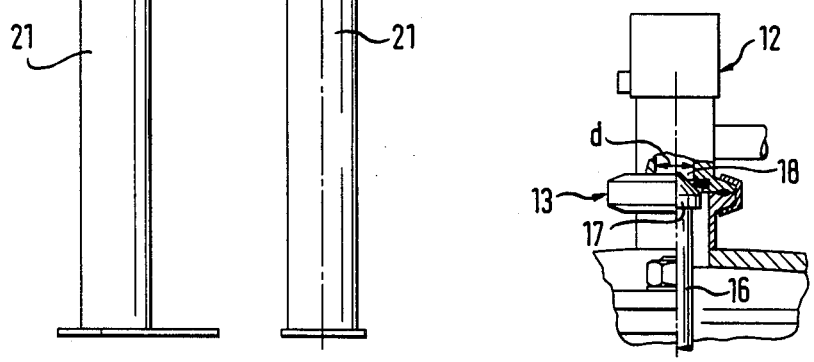
FIG.2
FIG.3

FLOWMETER SYSTEM

BACKGROUND OF THE INVENTION

The invention concerns a flowmeter system receiving liquids from stationary reservoirs onto tanker vehicles, in particular for milk, with a self-priming displacement pump followed by a deaerator with a venting valve above a float acting on it, the aerator being followed by a flowmeter in turn followed by a check valve.

Known metering systems of this kind suffer from the drawback that accurate volumetric control must be provided in the deaerator and hence accurate measurement values remain to be provided.

In these systems the float is connected by a float rod to the sealing member of the venting valve. After all the liquid has been passed, the displacement pump delivers air from the supply tank and presses this air into the deaerator. Thereby the liquid in the deaerator is delivered to the flowmeter until the float opens the venting valve of the deaerator.

This opening mechanism takes place in impulsive manner: the pressure building up in the upper region of the deaerator acts on the sealing member of the venting valve and keeps it closed until the liquid level in the deaerator drops below a specific level underneath the float's floating position. Hence the venting valve following the drop of the liquid level underneath the floating position is opened impulsively by the intrinsic weight of the float falling into the floating position, and thereupon the delivery of the liquid also comes to a stop impulsively.

Inaccuracies of measurement may occur if the magnitude of the drop by the deaerator's float is relatively large because the delivery of residual quantities may result in a post-delivery of liquid into the deaerator without the residual quantities sufficing to close the venting valve again. In this manner an imprecisely defined quantity is stored in the deaerator when delivery is shut off, and this amounts to inaccuracy.

Therefore the attempt must be made to minimize the drop.

On the other hand it is already known to quantify using relatively expensive electronic level controls in the form of pickups or the like.

These known systems however suffer from the drawback of the entailed apparatus complexity and furthermore that the milk delivered by the displacement pump tends to foam and hence the electric or electronic pickups provide inaccurate data. These problems are intensified when large flow rates especially of milk are involved, that is, when a high rate is required. These difficulties are enhanced in tanker vehicles when the reservoirs are at a relatively low position and therefore long intake lines are required.

SUMMARY OF THE INVENTION

Accordingly it is the object of the invention to provide a flowmeter system of the initially cited kind that for a simple configuration of the deaerator, the system is nevertheless capable of high rates, that is to receive large quantities per unit time of liquid while also being capable of accurate quantification, the additional expenditure in control means to remain minimal.

This problem is solved by the invention in that the inside diameter of the venting valve aperture and the outside diameter of the float in the deaerator are related as follows $$d^2/D^2 = p/c$$

where
- $d$ = inside diameter of the venting valve aperture
- $D$ = outside diameter of the float
- $p$ = pressure in bars generated by the displacement pump for pure air conveyance when air from the supply tank is compressed into the deaerator
- $c$ = 78.

Consequently a specific pressure-dependent relation between the area of the venting aperture and the cross-sectional area of the float is set for all deaerators met with in practice, whereby optimal supply and accurate quantification, that is accurate shut-off by the deaerator, is obtained.

Thus it was surprisingly found that using the above relation, it is possible to achieve a minimum drop and hence a maximum in measurement accuracy for all current deaerators.

Because only the ratio of the two surfaces is involved, the dimensions of D and d are arbitrary, though it must always be the same in both cases. The above relation was found after lengthy experimentation.

The accuracy of measurement possible with the system of the invention may even exceed that obtained with electronic and other controls, a special advantage of the system of the invention being its stunningly simple design requiring no additional control means at all.

The system of the invention is sturdy and furthermore offers the advantage of operating with outstanding accuracy by means of the central arrangement of the float even when standing on an uneven terrain, and accordingly the terrain configuration does not affect accuracy measurement; this is especially significant for tanker vehicles receiving milk at farms or the like.

BRIEF DESCRIPTION OF THE DRAWINGS

The invention is discussed in closer detail below in relation to an illustrative embodiment shown in the drawing.

FIG. 2 is a partial section of the deaerator of the system of FIG. 1, and FIG. 3 is an enlarged scale cut-out of FIG. 2 in the area of the venting valve.

DESCRIPTION OF THE PREFERRED EMBODIMENTS

Figure 1:
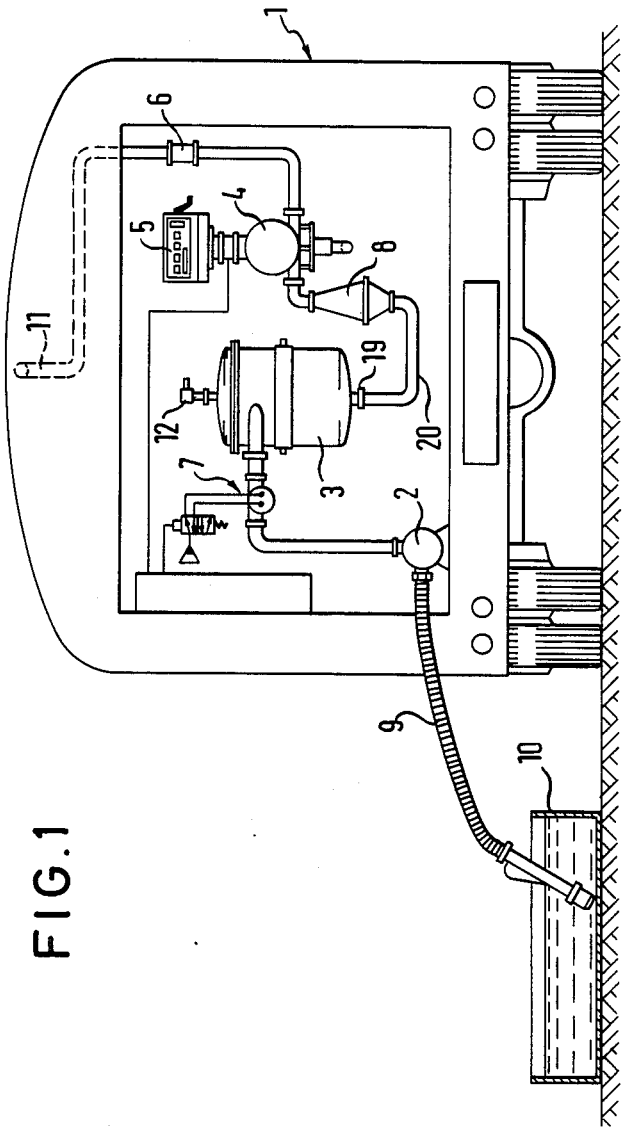
FIG. 1 is a schematic of a flowmeter system in a tanker vehicle object of the invention.

As shown in FIG. 1, a flowmeter system is mounted on a tanker vehicle 1, consisting of a self-priming displacement pump 2, a deaerator 3, a flowmeter 4 with a counter means 5 and a check valve 6. A sampling device 7 and a cleaning strainer 8 are further inserted into the flowmeter line of FIG. 1. The liquid received, in particular milk, is picked up from a relatively low supply vessel or reservoir 10 through an intake line 9 and is fed through the flowmeter system and a line 11 into the vesel of the tanker vehicle.

The deaerator 3 is provided in its upper region with a venting stub 12 sealed by a venting valve 13 (FIGS. 2 and 3).

FIG. 2 is a partial section of the configuration of the deaerator 3 of FIG. 1 and shows a float 15 mounted within the deaerator housing 14 and guided by a float rod 16. The diameter of the float 15 is denoted by D.

The sealing member 17 of the venting valve 13 is mounted at the upper end of the float rod 16; this sealing member 17 may be conical as illustrated; it seals the venting aperture 18 (FIG. 3) of the venting valve when the float 15 is raised.

As shown by FIG. 3, the venting aperture 18 has a diameter d which is related to the diameter D of the float 15 in the ratio called for by the invention.

The deaerator housing 14 includes a lower hook-up stub 19 connected to the flow line 20 leading to the flowmeter 4 (FIG. 1). The housing 14 may rest on three or more legs 21, two of which are shown in FIG. 2.

I claim:

1. In a flowmeter system for receiving liquids from stationary reservoirs onto tanker vehicles having a self-priming displacement pump followed by a deaerator, wherein a venting valve has an aperture with a given inside diameter mounted above a float having a given outside diameter acting on said valve, the deaerator being followed by a flowmeter which in turn is followed by a check valve, the improvement comprising: said given inside diameter (18) of said venting valve (13) and said given outside diameter (D) of said float (15) in said deaerator (3), are related according to the following formula:

$$d^2/D^2 = p/78$$

wherein d = said inside diameter of said aperture of said venting valve;

D = said outside diameter of said float;

p = pressure in bars generated in said deaerator by said displacement pump with pure air conveyance.

* * * * *